United States Patent Office 3,178,448
Patented Apr. 13, 1965

3,178,448
THERMALLY - SENSITIVE 3 - CYANO - 2 - DICYANOMETHYLENE - 4,5 - DIHYDROCARBON - 5-HYDROXY - PYRROLINES AND THEIR PREPARATION
Edward George Howard, Jr., Hockessin, Del., assignor to E. I. du Pont de Nemours and Company, Wilmington, Del., a corporation of Delaware
No Drawing. Filed Sept. 15, 1961, Ser. No. 138,284
6 Claims. (Cl. 260—326.5)

This invention relates to a new class of thermally-sensitive organic compounds, more particularly hydroxy-pyrrolines, to processes for preparing the same, and to thermally-sensitive recording elements using such compounds.

The copying of correspondence, drawings and other related materials for file and record purposes by means of image-forming elements has become common practice in our economy. Several techniques and materials useful therein, based on optical, thermal, and pressure-transfer techniques, have been developed. Many of these copying systems work well and give readable, clear copies. However, there is room for improvement in the physical quality of the substrates used in the copy sheets. This also has an important bearing on the life of the resultant copies during handling and storage.

An object of this invention is to provide new thermally-sensitive organic compounds. Another object is to provide such compounds which can be used to produce images of good resolving power. Yet another object is to provide such compounds which can be made in an economical manner and can be readily coated or impregnated on supports to form thermographic image recording elements. A further object is to provide copy material using such compounds which can be used over a wide range of image-yielding conditions. Still further objects will be apparent to those skilled in the art from the following description of the invention.

The 3 - cyano - 2-dicyanomethylene-5-hydroxy-3-pyrrolines or, alternatively, 3-cyano-2-dicyanomethylene-3-pyrrolin-5-ols, of the present invention can be represented by the following structural formula:

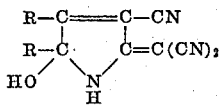

in which the R's, when separate, can be the same or different and can be monovalent hydrocarbon and oxa-, aza-, and thia-containing hydrocarbon radicals free of aliphatic unsaturation and generally no more than 12 carbons each, which radicals include specifically alkyl, cycloalkyl, aryl, aralkyl, alkaryl, arcycloalkyl, cycloalkylaryl, alkcycloalkyl, cycloalkylalkyl, oxacycloalkyl, azacycloalkyl and thiacycloalkyl radicals, and the R's, when together, constitute a single divalent hydrocarbon radical free of aliphatic unsaturation and of a total of no more than 10 carbons that forms with the 4- and 5-carbon atoms of the pyrroline ring a carbocycle of 5–9 ring atoms.

As indicated above, the new pyrrolinols of this invention are 3 - cyano - 2-dicyanomethylene-3-pyrrolin-5-ols, i.e., 3-cyano-2-dicyanomethylene-5-hydroxy-3-pyrrolines, which have on the 4- and 5-positions monovalent hydrocarbon and oxa-, aza-, or thia-containing hydrocarbon radicals of no more than 12 carbons each, with the proviso that the 4- and 5-substituents can be together joined to form with 4- and 5-carbons of the pyrroline ring carbocycles of from 5 to 9 ring members. Specific examples of these new and useful pyrrolinols, in addition to those illustrated in the following examples, include 3-cyano-2-dicyanomethylene - 5 - hydroxy - 5 - methyl - 4 - phenyl-3-pyrroline as obtained from 1-phenyl-1,2-propane-dione and malononitrile dimer; 3-cyano-2-dicyanomethylene-4-α-furyl-5-hydroxy-4-methyl-3-pyrroline as obtained from 1-α-furyl-1,2-propanedione and malononitrile dimer; 3-cyano - 2-dicyanomethylene-5-hydroxy-4,5-tetramethylene-3-pyrroline, (i.e., 7-cyano-8-dicyanomethylene-1-hydroxy-9-azabicyclo[4.3.0]non-6-ene), as obtained from cyclohexane-1,2-dione and malononitrile dimer; 3-cyano-2-dicyanomethylene - 5-hydroxy-4,5-heptamethylene-3-pyrroline, as obtained from cyclononane-1,2-dione and malononitrile dimer; 4,5 - dibenzyl - 3-cyano-2-dicyanomethylene-5-hydroxy-3-pyrroline as obtained from di(phenylacetyl), i.e., 1,4-diphenyl-2,3-butanedione, and malononitrile dimer; 3-cyano-2-dicyanomethylene-4,5-dicyclohexylmethyl-5-hydroxy-3-pyrroline as obtained from di(cyclohexylacetyl), i.e., 1,4-dicyclohexyl-2,3-butanedione, and malononitrile dimer; 3-cyano-2-dicyanomethylene-4,5-di-α-furyl-5-hydroxy-3-pyrroline as obtained from furil, i.e., di-α-furoyl, and malononitrile dimer; 3-cyano-2-dicyanomethylene-4,5-di-α-thienyl-5-hydroxy-3-pyrroline as obtained from α-thienil and malononitrile dimer; 3-cyano-2-dicyanomethylene - 4,5 - di-β-thienyl-5-hydroxy-3-pyrroline as obtained from β-thienil and malononitrile dimer; 3-cyano-2 - dicyanomethylene-4,5-di-α-pyrrolyl-5-hydroxy-3-pyrroline as obtained from α-pyrrolil and malononitrile dimer, and the like.

The new cyanocyanomethylenepyrrolinols can be prepared by the direct condensation under aqueous basic conditions between the requisite vicinal diketone, i.e., 1,2-diketone, and malononitrile dimer, i.e., 2-amino-1,1,3-tricyanoprop-1-ene. The two reactants are preferably used in essentially equimolar reactive proportions.

The condensation normally is carried out at temperatures in the ranges —25 to 150° C. or higher, preferably between 0 and 100° C., and for convenience most preferably in the range 10–70° C., and an aqueous alkaline medium. The condensation is base catalyzed, i.e., molar proportions of base are not necessary and in fact should be avoided in the case of the stronger bases since high proportionalities of these strong bases lead to scission of the pyrroline rings. The degree of basicity usually will range between a pH of 7 and a pH of 9. This degree of basicity can be readily obtained by adding controlled amounts of the strong organic or inorganic bases or larger quantities of weaker bases.

The base used to furnish the required degree of alkalinity can be any one or more of the well-recognized classes or inorganic and organic bases. Specific illustrations of the more common of the inorganic bases include, for instance, the alkali and alkaline earth metal oxides, hydroxides, e.g., lithium hydroxide, sodium hydroxide, potassium hydroxide, calcium hydroxide and calcium oxide, and alkaline reacting salts, for instance, the alkali metal salts of weak acids, e.g., the acetates, borates, carbonates, and bicarbonates, phenolates, phosphites, and acid phosphites. As illustrative of the organic bases there can be mentioned the alkali metal and alkaline earth metal alcoholates, usually the alkoxides, e.g., lithium methylate and the like; the basic amines such as the tertiary aliphatic amines and quaternary ammonium hydroxides, e.g., triethylamine and tetramethyl- and tetraethylammonium hydroxide.

The vinical diketones used as one of the essential reactants in forming the new 3-cyano-2-dicyanomethylene - 4,5 - dihydrocarbon - 5 - hydroxy - 3 - pyrrolines of the present invention are simply those organic compounds containing at least one pair of carbonyl groups directly joined to each other per molecule and otherwise linked directly only to carbon. These vicinal diketones have the formula RCOCOR wherein the R's are monovalent hydrocarbon and oxa-, aza-, or thia-containing hydrocarbon radicals of up to 10 carbons alike or different, which are preferably free of aliphatic unsaturation, and can be aliphatic, aromatic, alkaromatic, araliphatic, or cycloaliphatic, in nature, and can also be together joined to form with the two carbonyl carbons a cyclic structure of as many as a total of 20 ring members but conventionally of five to nine ring units. It is to be noted that the two R's appear as substituents on the 4 and 5 carbons in the final 5-hydroxy-3-pyrrolines and in those instances where the R's are joined together the final products will be bicyclic in structure with the fused ring stemming from the pyrroline structure in the 4,5 positions. Because of problems arising in separating the 4,5 position isomers, it is generally preferred to use vicinal diketones where both R groups are the same. Undesirable side reactions are frequently encountered under the necessary basic conditions, with vicinal dicarbonyl compounds having hydrogen on oxo carbon. The use of symmetrical vicinal diketones results in the most preferred products, the 4,5-symmetrically disubstituted 3-cyano-2-dicyanomethylene-5-hydroxy-3-pyrrolines.

The present invention thus is generic to the use of vicinal diketones including, in addition to those of the examples: aliphatic diketones, e.g., 2,2,5,5-tetramethyl-3,4-hexanedione, and the like; aromatic diketones, alkaromatic diketones, e.g., 1,2-di-p-tolyl-1,2-ethanedione, i.e., tolil in trivial nomenclature, and the like; araliphatic diketones, e.g., 1,2-dibenzyl-1,2-ethanedione (i.e., 1,4-diphenyl-2,3-butanedione), and the like; cycloaliphatic and cycloaliphatic/aliphatic diketones, e.g., 1,4-dicyclohexyl-2,3-butanedione, 1,2-cyclopentanedione, 1,2-cyclohexanedione, and the like; mixed substituent α,β-dicarbonyl compounds, e.g., unsymmetrically substituted vicinal diones, e.g., 1-phenyl-1,2-butanedione, 1-phenyl-1,2-propanedione, and the like.

In addition to certain indicated trivial names, these compounds can also be named as derivatives of glyoxal and indeed this seems to be preferred to the ethanedione type name. However, for reasons of consistency and to emphasize further the similarity in structure and reactivity, these intermediates have all been named in the foregoing primarily as vicinal diones.

As illustrated in the following detailed examples, the new cyanodicyanomethylenehydroxypyrrolines are useful as the active or color-forming reagent in the formation of thermographic copying sheets. The substrates for use in formation of the copying sheets can be rigid or flexible and can include such subtrates as wood, paper, glass, fabrics, and the like. While the substrates for forming the thermographic sheets can be as broad as in the foregoing, the most important such substrates, for obvious reasons of more important use, are the flexible supports.

The flexible support of the thermally sensitive permanent image-recording elements of the invention can vary widely in constitution but should not be a good conductor of heat because the image is produced thermally and a heat-conductive support, e.g., a metal foil or a self-supporting film or layer containing an appreciable quantity of powdered metal, would prevent the formation of a sharp image. In general, the flexible support can be composed of an organic polymeric material having a softening point above the temperature at which the thermographic image is formed, e.g., about 150–225° C. Suitable such polymeric materials include paper, thin cardboard, self-supporting films composed of cellulose and regenerated cellulose such as cellulose ethers, e.g., methyl cellulose, ethyl cellulose of low substitution, cellulose esters, e.g., cellulose triacetate; synthetic macromolecular polymers, including polyvinyl acetals, e.g., polyvinyl formal; polyvinyl esters, e.g., polyvinyl acetate of low acetate content; and proteins, e.g., gelatin. Instead of films, the foregoing synthetic polymers can be layers on paper or another support. The supports can be used in the form of films and in the form of felted sheets made from fibers of the cellulosic or other polymeric materials referred to above. Flexible supports made from the foregoing materials, as is well known, are not good conductors of heat but have low heat conductivity.

For some uses the flexible sheet support should be infrared-transparent to permit the formation of the color image in depth and in, for instance, reflex copying to permit the satisfactory development of the image on the reverse surface or within the sheet. For other uses, for instance, recording paper for a suitably driven hot stylus, the flexible sheet support can be infrared-opaque. The flexible sheet support can be transparent or opaque to visible light. For contrast purposes, it is generally desirable that the flexible sheet support be somewhat opaque to visible light and, ideally, should exhibit a contrast color to the color of the thermographic image.

The 3-cyano-2-dicyanomethylene-4,5-dihydrocarbon-5-hydroxy-3-pyrroline can be brought into the necessary operative association with the flexible sheet support by any of the various conventional coating and impregnating procedures. When the flexible sheet support used is a film of a polymer which is not easily penetrated by the thermographic agent or solutions thereof, for instance, a preformed sheet of a condensation polymer, e.g., polyhexamethyleneadipamide, the hydroxypyrroline in solution in a suitable solvent at the desired concentration and in combination with a suitable protective binder which is preferably adherent to the substrate, e.g., gelatin, is topcoated on the polyhexamethyleneadipamide base and the solvent allowed to evaporate. There is thus obtained a polyhexamethyleneadipamide base with a layer of the desired thickness of the pyrroline protected by the gelatin binder.

A convenient way to achieve a "deep" image with this type of sheet support is to dissolve the polymeric material forming the flexible sheet support in a suitable solvent and to add thereto the required amount of the pyrroline to give the desired concentration at the desired thickness and then to cast the solution by conventional film-casting techniques and allow the solvent to evaporate. Various binders can be used in place of gelatin. Suitable binders include natural and synthetic organic colloids having protective colloid properties, e.g., casein, polyvinyl alcohol, polyvinyl acetals and esters containing unsubstituted vinyl alcohol units, and polyvinyl pyrrollidone.

In those instances where the flexible sheet support is absorbent of, or easily penetrated by, suitable solvents for the 3-cyano-2-dicyanomethylene-4,5-dihydrocarbon-5-hydroxy-3-pyrroline, for instance, in the case of most of the commercially available paper stocks, it is necessary only to dip the paper stock in a solution of the pyrroline at the desired concentration and allow the solution to impregnate and be absorbed by the paper. Upon evaporation of the solvent, the pyrroline will be substantially uniformly and homogeneously distributed throughout the thickness of the paper. The resultant thermographic image obtained from such an impregnated paper is "deep" in that it is formed throughout the thickness of the paper. Thus, a conventional onionskin paper can be used instead of the thin translucent type required in the prior art method where the sensitive coating is on the back surface of the sheet. The higher visual opacity of the onionskin paper as well as its greater stiffness makes the copies much more attractive than previous types.

Production of the thermographic image in the new elements of the present invention can be achieved in any way whereby the element comprising the flexible sheet support and in operative association therewith the necessary 3-cyano-2-dicyanomethylene-4,5-dihydrocarbon-5-hydroxy-3-pyrroline is selectively exposed to the required color-developing temperatures to form the desired pattern. For instance, the thermographic element can be pressed with a heated stylus operated manually or mechanically as the recording or copy arm of a sensing system driven by a photoelectric scanning beam. In a similar fashion, heated type characters, slugs, or complete composed plates may be pressed directly in contact with the thermographic element. Alternatively, the thermographic images can be prepared by suitable selective infrared radiation absorption. Thus, a master to be reproduced will generally have a dark text on a white background. Accordingly, on exposure to infrared radiation or to normal actinic light, the black areas are selectively warmer than the white areas by virtue of the selective absorption of the infrared radiation in the dark areas. With light of sufficient intensity directed on such an original held in contact with one of the thermographic elements of the present invention, the original is heated in the dark areas to temperature ranges wherein the thermographic reaction occurs in the thermographic element, thereby producing a colored direct positive duplicate of the original.

The temperatures to which these thermographic elements must be brought in order to develop the thermographic image will vary with the nature of the 3-cyano-2-dicyanomethylene - 4,5 - dihydrocarbon - 5 - hydroxy-3-pyrroline, the nature of the support, and the relative concentration of the hydroxypyrroline. Generally satisfactory colored images are obtained when the thermographic element is brought to temperatures between about 150° C. and about 225° C. A generally satisfactory average temperature would thus be in the neighborhood of about 175–200° C. The times at which these thermographic elements must be selectively held at such temperatures in order to develop satisfactory image quality likewise vary with the nature of the substituents on the pyrroline and in part with the nature of the support in the sense of the optical contrast qualities thereof. An approximate shortest color development time at these temperatures is in the neighborhood of about 0.1–2.0 seconds; whereas, with some of the less reactive pyrrolines reaction times of up to 30–45 seconds or even a few minutes or longer are needed. Generally speaking, an average color development time at the average development temperature of about 200° C. will be about 1.0 to 2.0 seconds.

While the thermographic images are readily developable of themselves in systems comprising only the flexible sheet support and the hydroxypyrroline, for some particular uses, e.g., with the light weight, non-coated, less rugged paper stocks, the development temperatures required of the unmodified systems are undesirably close to the decomposition or char point of the flexible sheet support of this type. Accordingly, it is desirable in such uses to activate the systems. A suitable means of doing this is to supply in operative association with the thermographic element an activator for the thermographic reaction of the 3-cyano-2-dicyanomethylene - 4,5 - dihydrocarbon-5-hydroxy - 3 - pyrroline. Suitable activators for the thermographic, i.e., thermal color-forming, reaction will be found among those materials or mixtures of materials which are capable of releasing a base with increasing temperature, i.e., thermal base-generating compositions.

Probably the most common of such materials and systems are those which with increasing temperature generate ammonia or amines. Suitable specific examples of such material include the ammonium bases of weak acids, e.g., ammonium cyanate and the like, as well as urea and simple substituted ureas, e.g., the lower alkyl-substituted ureas described in U.S. Patent 2,732,299. These base-generating activators will be in operative association with the thermographic element in amounts ranging from one-tenth to two to three times the weight of the thermographic 5-hydroxy-3-pyrroline. For reasons of convenience and for increased efficiency, the base-generating activators are preferably dispersed throughout the thermographic element and are conveniently obtained by being applied to the flexible sheet support in conjunction with the hydroxypyrroline by treatment of the support with a solution of the hydroxypyrroline and the base-generating activator in a mutual solvent. However, the activator can obviously be applied separately on or within, or both, either the flexible sheet support alone or the flexible sheet support already containing the thermographic material.

Suitable images of adequate density are obtained when the hydroxypyrroline is present in concentrations ranging from 10 to about 500 mg./dm.$^2$ of flexible sheet support surface. Higher loadings can readily be achieved, but at levels above approximately 200 mg./dm.$^2$ the hydroxypyrroline tends to crystallize out on the surface of the coated sheet. Without some sort of suitable topcoat protective binder, the hydroxypyrroline as it crystallizes out at the higher concentrations tends to be physically removable by abrasion. Accordingly, loadings much above this approximate 200 mg./dm.$^2$ figure will not normally be used nor needed. Decreased cost as well as avoidance of the above problems make coating weights in the range from 25 to 100 mg./dm.$^2$ preferred. However, if heavier coatings are needed for some particular reason in the copy process, a suitable protective topcoat colloid can be applied. If such an element is intended for use in reflex copying, this topcoat obviously must be infrared transparent and likewise visibly transparent in order that (1) the thermographic image can be obtained, and (2) once obtained can be seen.

The invention will be further illustrated by but is not limited to the following examples:

*Example 1*

To a mixture of 8.6 parts of freshly distilled diacetyl, i.e., 2,3-butanedione, 100 parts of water, and 13.2 parts (an equimolar proportion based on the diketone) of 2-amino-1,1,3-tricyanoprop-1-ene was added to room temperature with shaking 0.7 part of 5% aqueous sodium hydroxide solution. The temperature rose to 35° C. and the yellow color of the diacetyl slowly faded. The solid aminotricyanopropene almost completely dissolved, when suddenly the reaction mixture set up to a white crystalline solid mass. The mixture was shaken at 35° C. for 15 minutes, cooled to 10° C., and the solid removed by filtration. After washing with water and drying, there was thus obtained 20 parts (100% of theory) of crude 3-cyano - 2 - dicyanomethylene-4,5-dimethyl-5-hydroxy-3-pyrroline. An analytical sample was recrystallized from ethyl acetate and was obtained as colorless crystals with a slight yellow tint, melting at 174–177° C. with decomposition.

*Analysis.*—Calcd. for $C_{10}H_8N_4O$: C, 60.0%; H, 4.0%; N, 28.0%. Found: C, 60.3%; H, 4.3%; N, 27.4%.

The infrared spectrum of the product showed characteristic absorption at 4.50 micron for conjugated nitrile, at 3.07 micron with a shoulder at 2.98 micron characteristic of NH and OH groups, at 6.13 micron and 6.27 micron characteristic of a C=C group, and at 8.75 micron characteristic of a C—O group.

Thermographic copying elements, i.e., elements useful in the reproduction of text matter by thermal means, were prepared by impregnating filter paper with the above 3 - cyano - 2 - dicyanomethylene-4,5-dimethyl-5-hydroxy-3-pyrroline. Thus, 12 sheets of standard circular 15 cm. single weight filter paper were placed in a glass crystallizing dish, and a solution of 1 g. of the cyanodicyanomethylenedimethylhydroxypyrroline in 25 ml. of acetone was poured thereover and the acetone then allowed to evaporate at room temperature. The impregnated paper thus contained 48 mg./sq. dm. of the pyrroline. Samples of the impregnated paper, when placed on an electric hot plate at about 150° C., turned intense blue-black in about four or five seconds. Similarly, when further samples of the impregnated paper were pressed to the surface of a heated printing plate (about 200° C.), a deep blue print of the text in the plate in faithful register and good fidelity was obtained in about five to ten seconds.

The impregnated paper is as white as the untreated paper. Accordingly, when the thermographic reaction is achieved resulting in the deep blue to blue-black letter-text, good contrast is obtained with no background color and the image is sharp, and easily readable. The presence of trace amounts of $Cu^{++}$, $Ag^+$, and $Fe^{++}$, obtained by adding a few crystals of cupric acetate, silver nitrate and ferrous chloride to the impregnating methanol or acetone solution, activates the color-forming reaction and results in lowering the temperature at which the color-forming reaction occurs by as much as 25 to 50° C. The impregnated paper containing, in addition to the pyrroline, the salt activator has a slight pale pink background. However, contrast of the thermographic image is good, as also is readability.

The 3-cyano - 2 - dicyanomethylene-4,5-dimethyl-5-hydroxy-3-pyrroline is also useful as a dye for various fabrics. As is generically true of all the 3-cyano-2-dicyanomethylene - 4,5 - dihydrocarbon - 5 - hydroxy-3-pyrrolines of the present invention, all that is necessary is to impregnate the fabric involved with the pyrroline and heat the impregnated fabric to the color-forming temperature range. To illustrate, a sample of so-called record cloth, which is a test fabric used in the trade comprising adjacent woven panels of different commercially available fabrics, e.g., cotton, nylon, silk, and wool, was impregnated with the 3-cyano-2-dicyanomethylene-4,5-dimethyl-5-hydroxy-3-pyrroline by dipping into an acetone solution thereof at a concentration of about 5%. The thus-impregnated fabric was removed from the acetone solution and the acetone allowed to evaporate at room temperature and atmospheric pressure. The dried, impregnated fabric was then heated to 150° C. by placing on an electric hot plate at this temperature. In about ten seconds, the various fabric strips had assumed their different combined dyed colors. The heated, impregnated cloth was then washed with acetone and then with soap and water. On air-drying, the cotton section was found to be dyed gray, the nylon section brown, the silk section green, and the wool section pale green. Also, the dyed colors are both acetone- and soap-fast.

*Example II*

To a solution of 5.28 parts of 2-amino-1,1,3-tricyanoprop-1-ene and 8.4 parts (an equimolar proportion based on the nitrile) of benzil, i.e., 1,2-diphenyl-1,2-ethanedione, in about 115 parts of absolute ethyl alcohol at 43° C. was added about .75 part of a 5% aqueous sodium hydroxide solution. The temperature of the reaction mixture rose to 47° C., and the solution became red in color. The reaction mixture was allowed to cool to room temperature and held there for a period of three days. The resulting solid product was removed by filtration and dried. There was thus obtained 13 parts (88% of theory) of 3-cyano-2-dicyanomethylene-4,5-diphenyl-5-hydroxy-3-pyrroline monoethyl alcoholate as a crystalline yellow solid. An analytical sample was obtained by recrystallization from absolute ethyl alcohol and dried at 55° C. under a pressure corresponding to 0.5 mm. of mercury. The purified crystalline yellow pyrroline alcoholate melted at 215–220° C., with decomposition beginning at 190° C.

*Analysis.*—Calcd. for $C_{22}H_{18}N_4O_2$: C, 71.3%; H, 4.9%; N, 15.1%. Found: C, 70.8%; H, 4.7%; N, 14.9%.

*Example III*

A sample of polymeric cycloheptanedione as a brown syrup was converted to the monomeric form by heating at 120° C. under a pressure corresponding to 0.3 mm. of mercury. To a solution of 7.4 parts of the thus obtained monomeric, bright yellow cycloheptanedione and 7.8 parts (an equimolar proportion based on the dione) of 2-amino-1,1,3-tricyanoprop-1-ene in about 25 parts of tetrahydrofuran at room temperature was added 50 parts of water and 0.5 part of 5% aqueous sodium hydroxide solution. An exothermic reaction occurred, and after allowing the reaction mixture to stand for 15 minutes at room temperature, it was poured into excess water. The resultant white solid was removed by filtration and after drying there was thus obtained 11 parts of 3-cyano-2-dicyanomethylene - 5 - hydroxy-4,5-pentamethylene-3-pyrroline·hemihydrate, alternatively named as 8-cyano-9-dicyanomethylene - 1 - hydroxy-10-azabicyclo[5.3.0]-dec-7-ene. After recrystallization from chloroform, the pyrroline exhibited a melting point of 174° C. as obtained on a gradient melting point bar. When the melting point was taken on a block, the material decomposed at 165° C. to a highly colored substance.

*Analysis.*—Calcd. for $C_{13}H_{12}N_4O \cdot \frac{1}{2}H_2O$: C, 62.7%; H, 5.2%; N, 22.5%. Found: C, 62.5%; H, 5.3%; N, 22.0%.

Filter paper was impregnated and dried as in Example I, varying only in that a methanol solution of the pyrroline was used. When the impregnated paper was heated at 150° C., a dark, dull, green color developed. When heated at 190° C., a chocolate brown color developed. When a heated (about 200° C.) type face was pressed against the impregnated paper, a clear green print of the letter-text of the type developed in the paper with good fidelity, deep contrast, and clear background.

The novel thermally sensitive recording elements of this invention have advantages when used in charts to be marked with a stylus over prior art materials. The latter generally employ a dark-colored paper with a white, opaque coating that becomes clear on application of heat, thereby producing a dark area on a white background. Typical coatings of this type are based on opaque, waxy, or crystalline materials, blushed resin coatings (see U.S. Patent 2,519,660), or plastic films containing microscopic voids (see U.S. Patent 2,739,909). Waxy coatings stick to adjacent layers and because of their softness are easily damaged. The blushed resin coatings must be applied under carefully controlled conditions to avoid variations in opacity of the coatings. The third type of film—that containing the microscopic voids—is widely used, but careful balancing of ingredients is required to produce a film which can be marked at available temperatures but also will be not unduly sensitive to pressure. All of these types of coatings must be applied to a colored base, which is generally paper carrying a dark pigmented coating. In addition, volatile organic solvents are necessarily employed in the product of all three types.

As illustrated in the foregoing detailed examples, the new 3-cyano-2-dicyanomethylene-4,5-dihydrocarbon-5-hydroxy-3-pyrrolines of the present invention are also useful as dyes or dyeing agents for conventional textile fabrics. The pyrrolines can be applied to the fabrics involved by conventional solution techniques, varying with the nature of the fabric so that only solvents for the pyrrolines, inactive with respect to the various fabrics, will be used. The pyrrolines can also be applied by other conventional dyeing techniques, including padding. The various fabrics impregnated with the desired hydroxy-pyrrolines at conventional dye loadings show substantially no difference after being impregnated and dried than the various untreated fabrics.

The desired color will be developed in the impregnated and dried fabric by direct thermal means using any conventional sources of heat which are unreactive to the various fabrics. Probably the easiest and most rapid thermal color development technique involves direct thermal contact between the treated fabric and heated metal platens. The heating of such platens can be by any conventional means, including gas and electric heat. Alternatively, the color development can be effected, probably in most controllable manner, by suitable throughput of the impregnated fabric through a thermostatted air oven heated by any conventional means. Such technique is more efficient in a continuous manner and accordingly will be most important as applied to production rolls of fabric. Patterns can also be achieved by running the impregnated fabrics between heated rolls with the desired design in height relief.

The invention has the advantage that it provides a new class of thermally sensitive organic compounds which have commercial utility for various arts. The compounds are especially useful for the manufacture of thermally-sensitive image-recording elements and the latter have the advantage that they are economical to make and use for copying typed pages, printed matter, drawings, etc. The copy material of the invention provides image-yielding elements capable of forming adequate dark colored, sharp, legible images on a white or light-colored background.

The image-yielding elements of the invention have the further advantage that their use as copying material does not require skilled operators or technicians. A large number of reproductions can be made rapidly from text material or drawings to be copied. Still other advantages will be apparent from the foregoing description of the invention.

I claim:

1. A 3-cyano-2-dicyanomethylene-5-hydroxypyrroline of the formula:

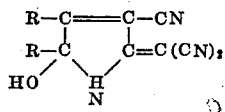

wherein R is selected from the group consisting of monovalent hydrocarbon radicals of no more than 12 carbon atoms selected from the class consisting of alkyl, cycloalkyl, aryl, aralkyl, alkaryl, cycloalkylaryl, alkcycloalkyl, cycloalkylalkyl; furyl, pyrryl and thienyl; and when taken together with the attached carbon atoms forms a polymethylene ring of 5–9 carbon atoms.

2. 3 - cyano - 2 - dicyanomethylene-4,5-dimethyl-5-hydroxy-3-pyrroline.

3. 3 - cyano - 2 - dicyanomethylene-4,5-diphenyl-5-hydroxy-3-pyrroline.

4. 3 - cyano - 2 - dicyanomethylene-5-hydroxy-4,5-pentamethylene-3-pyrroline.

5. A process for the preparation of a hydroxypyrroline which comprises reacting
(1) a vicinal diketone of the formula:

RCOCOR wherein each monovalent hydrocarbon radical R is selected from the group consisting of a monovalent hydrocarbon radical of 1–10 carbon atoms selected from the class consisting of alkyl, cycloalkyl, aryl, aralkyl, cycloalkylaryl, alkcycloalkyl and cycloalkylalkyl; furyl, pyrryl and thienyl with (2) 2-amino-1,1,3-tricyanoprop-1-ene in about equimolar proportions at a temperature from −25° C. to +150° C.

6. A process according to claim 5 wherein the process is carried out at a temperature from 10° C. to 70° C. in an aqueous alkaline medium at pH 7–9.

References Cited in the file of this patent
UNITED STATES PATENTS

| | | |
|---|---|---|
| 2,623,882 | Meyer | Dec. 30, 1952 |
| 2,940,866 | Sprague et al. | June 14, 1960 |
| 2,950,987 | Howard | Aug. 30, 1960 |
| 2,995,568 | Malz et al. | Aug. 8, 1961 |

UNITED STATES PATENT OFFICE
CERTIFICATE OF CORRECTION

Patent No. 3,178,448　　　　　　　　　　　　　　April 13, 1965

Edward George Howard, Jr.

It is hereby certified that error appears in the above numbered patent requiring correction and that the said Letters Patent should read as corrected below.

Column 9, lines 20 to 24, the formula should appear as shown below instead of as in the patent:

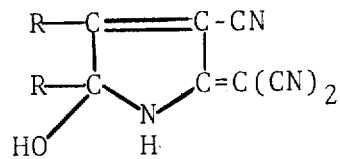

Signed and sealed this 5th day of October 1965.

(SEAL)
Attest:

ERNEST W. SWIDER
Attesting Officer

EDWARD J. BRENNER
Commissioner of Patents